G. GRIFFITH.
RANGE FINDER.
APPLICATION FILED JUNE 15, 1909.
959,338.
Patented May 24, 1910.
2 SHEETS—SHEET 2.
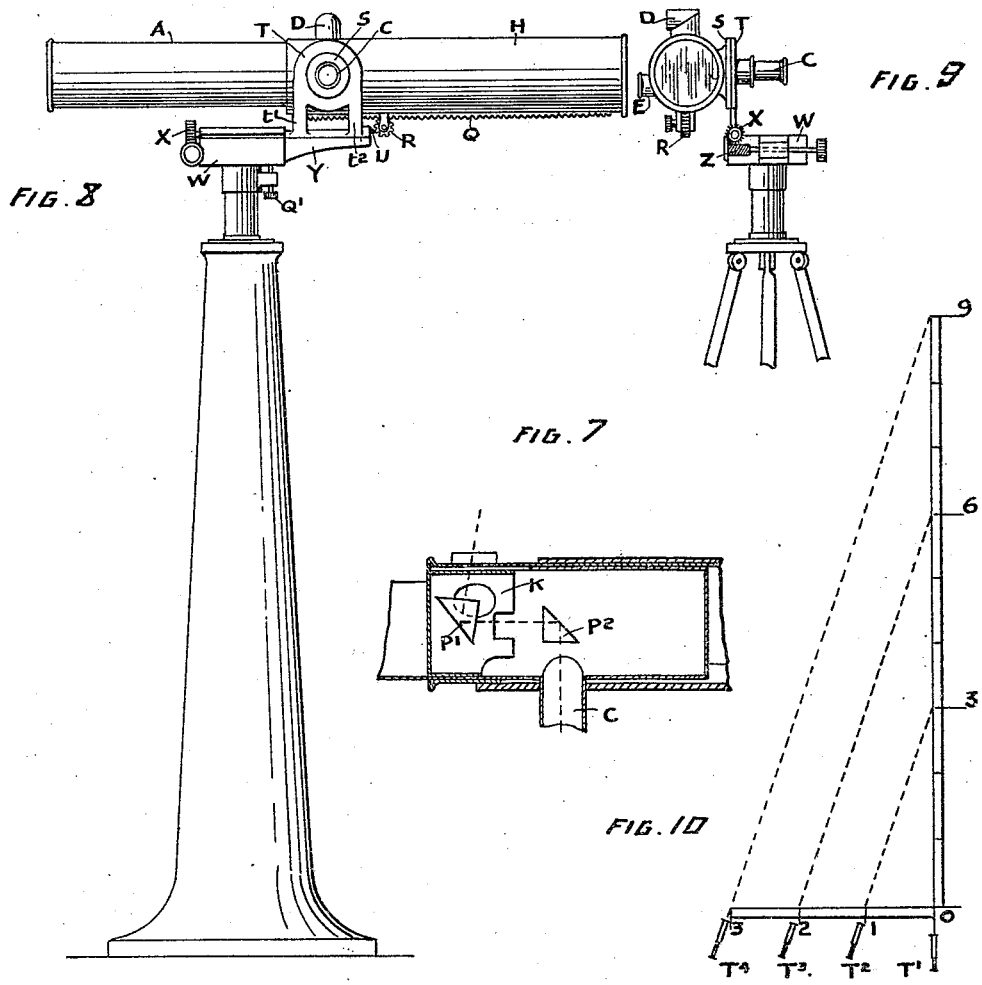
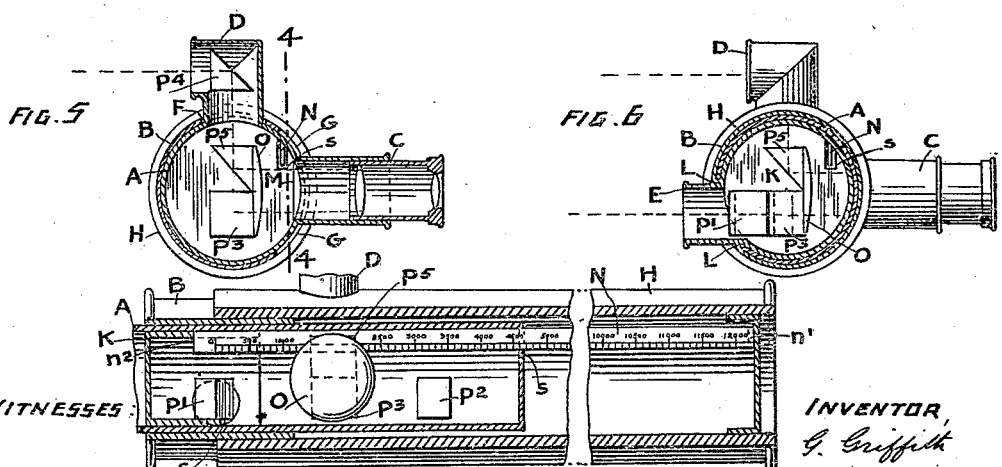
WITNESSES
N. B. Keating
Leon Boillot
INVENTOR
G. Griffith
By F. M. Wright
Attorney

UNITED STATES PATENT OFFICE.

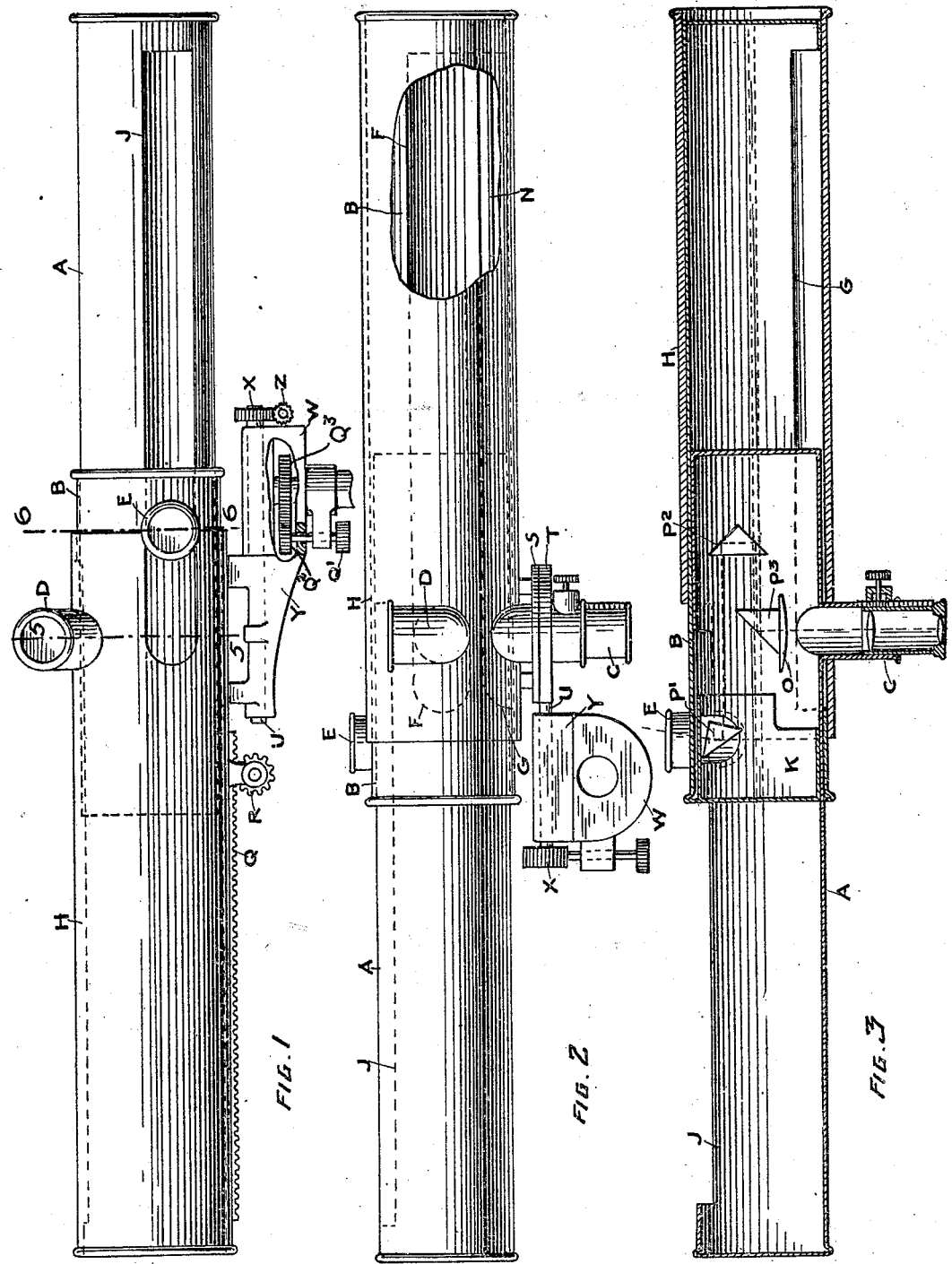

GRAVES GRIFFITH, OF SAN FRANCISCO, CALIFORNIA.

RANGE-FINDER.

959,338.  Specification of Letters Patent.  Patented May 24, 1910.

Application filed June 15, 1909. Serial No. 502,238.

*To all whom it may concern:*

Be it known that I, GRAVES GRIFFITH, a citizen of the United States, residing at San Francisco, in the county of San Francisco and State of California, have invented new and useful Improvements in Range-Finders, of which the following is a specification.

The object of the invention is to provide a new and improved range-finder of the constant angle and variable base type, for the use of military and marine officers, surveyors, and other persons, in ascertaining the distance of an object from the observer, whether it be located on land, at sea or in the air, without requiring calculation, or necessitating reference to tables or micrometer heads.

In this instrument is made use of the well known relationship existing between the like parts of similar right angled triangles, in combination with certain optical features, whereby the distance to an object is measured along a direct line passing through the object by means of an oblique ray from the same object being taken up by a set of properly arranged prisms and refracted toward and at right angles to the direct ray and finally parallel to it, both afterward passing as parallel rays through an object-glass and eye-piece common to both, the registration of this measurement being effected through a scale of a length equal to that of the variable base as established for a particular instrument.

In the accompanying drawings, Figure 1 shows a view of the instrument from the front, or object side. Fig. 2 is a top plan view of the instrument. Fig. 3 is a horizontal section of the instrument showing the position of the oblique ray system of prisms as placed in an instrument intended to take ranges from zero to any distance. Fig. 4 is a vertical section of same on line 4—4 of Fig. 5, showing the position of the scale N and its end attachments, to K at $n^2$, and to B at $n^1$. Fig. 5 is a vertical section on the line 5—5 of Fig. 1, showing the arrangement of the direct ray system of prisms, the position of the cross-hair M, and the guide-slot $s$ in the end of the tube A. Fig. 6 is a vertical section on line 6—6 of Fig. 1. Fig. 7 is a modification of the oblique ray system of prisms, arranged as intended for use in an instrument registering distances beyond a certain fixed distance. Fig. 8 is a view of the instrument as mounted on a fixed base or pedestal. Fig. 9 is a view of the instrument as mounted on a tripod. Fig. 10 is a diagram of a right angled triangle illustrative of the mathematical principle made use of in the instrument.

The mathematical principle involved in the instrument may be readily seen by a reference to the diagram of a right angled triangle as represented in Fig. 10. Assume a telescope $T^1$ mounted at right angle to $O^3$, its line of sight being along $O^9$. Again, assume a second telescope $T^2$ also mounted on $O^3$, slidable and inclined toward $O^9$ at any desired angle. It is apparent that if telescope $T^2$, retaining this angle of inclination to the line $O^9$, were to be moved along the line $O^3$, its line of sight would intercept, on $O^3$ and $O^9$ respectively, parts that would be proportional, the one to the other, and that the ratio existing between these intercepted parts would be dependent upon the degree of inclination of the line of sight of telescope $T^2$ to the line of sight of telescope $T^1$. Supposing $O^3$ scaled, and it were required to ascertain the distance from O of any point along the line $O^9$, it would only be necessary to move $T^2$ along the line $O^3$ until in alinement with that particular point, whereupon the required distance could be read from the scale as indicated by the position of telescope $T^2$.

Having thus described the mathematical principle of the instrument, it will next be shown how this is combined with certain optical features, and the arrangement and construction, as a whole, explained.

The optical feature of the instrument comprises two systems of prisms, the 90 degree reflecting, designated as the direct ray system, and the oblique ray system, each system lying in its respective plane, these planes being at right angles, the one to the other.

The direct ray system consists of two prisms, $P^4$ and $P^5$, Fig. 5, and receives the direct ray from the object, reflecting it, in the plane of this system, first at right angles and then parallel to its original distance course. The oblique ray system consists of three prisms, $P^1$, $P^2$ and $P^3$, Fig. 3, and receives the oblique ray from the object through E, reflecting it, in the plane of its system, first at right angles to the plane of the direct ray, and, in a final course, in the same plane as and parallel to the incident direct ray. At this point of parallelism, these two rays are received by and conveyed through a common object-glass and eye-piece to the eye of the observer. The prisms of these two systems are fixed, as regards the instrument, excepting prism $P^1$, Fig. 3, of the oblique ray system, which is mounted in a short tube K. This tube K has its rearward wall cut away, as shown, to permit the passage of the oblique ray, to the object-glass, and is connected, as is shown, to the movable tube B, thus providing for movement of prism $P^1$ along the line of its refraction, as will be hereinafter described. The prism $P^1$ may be set to receive the oblique ray at any desired angle to the direct ray.

The instrument comprises a fixed inner tube A with closed ends and having within it the short tube K, Fig. 3, which is connected by a tubular neck E, through a longitudinal slot J in tube A, to an outer tube B moving telescopically over the tube A.

The longitudinal guide-slot J provides for the passage of the tubular neck or connection between the tubes K and B, as motion is imparted to these tubes through the action of the rack and pinion Q R, Fig. 1.

The tube B is closed at one end, as shown, Fig. 2, and is supplied with two longitudinal guide-slots, F and G, providing for its movement past the fixed points, finder tube D and eye-piece tube C.

The finder tube D and the eye-piece tube C are in the same plane, but at right angles to each other, and also at right angles to the axial center of the tube A to which they are attached.

There is a scale N, of which one end is attached to K and the opposite end to the closed end of the tube B, that passes through a guide-slot $s$ in the end of the tube A, and moves in unison with tubes K and B. This scale N is of a length equal to that of the greatest length of the variable base as established for a particular instrument, and is scaled to read from zero to any desired distance. Crossing the face of the scale N at right angle to it and to the optical center of the object-glass O and eye-piece C is a cross-hair M that bisects the images formed by the direct and oblique rays, and also serves as an index to the scale.

The scale N, Fig. 4, is composed of a light metallic bar edged with celluloid or other translucent substance upon which are the scale markings, this enabling the scale to be read by means of the light transmitted through the object-glass O.

The tubes A and B together with their attached parts are held in position by means of the casing H from which the instrument is mounted.

The finder tube D and the eye-piece tube C are affixed to this casing H as well as to the tube A. B moves within the casing H and over the tube A, the said casing H and tube A being fixed relative to each other.

The movement of the tube B is effected through the action of the rack and pinion Q R, Fig. 1.

The mounting of the instrument is effected by means of the casing H to which is connected a ring S working in a concentric ring T which, in turn, is attached by arms, $t^1$ and $t^2$, to a journal U, Figs. 8 and 9. This arrangement permits of a complete revolution of the instrument about the axial center of the object-glass O and eye-piece C.

The journal U is journaled in the head W and is provided with a worm-gear which imparts a movement of at least 270 degrees to the instrument about the axial center of the journal U, Fig. 8.

The head W is pivoted on a neck forming the top of a pedestal, Fig. 8, or of a tripod, Fig. 9, and has imparted to it circular motion in a horizontal plane by means of gear $Q^2 Q^3$, Fig. 1.

While the instrument as here shown is mounted, it is also adapted to hand use when made on a smaller scale.

The instrument is readily understood and is of easy manipulation requiring no special training or instruction, and is essentially a one man instrument, covering as it does a field in any plane in addition to the scale and its index, or cross-hair, through a single object-glass and eye-piece.

The manipulation of the instrument is as follows: The observer, through the eye-piece C, directs the instrument upon the object whose distance, or range, is desired. The direct ray entering through D takes the course of the dotted lines, being reflected respectively by the prisms $P^4$ and $P^5$, Fig. 5, and enters the object-glass O in the plane of, but parallel to, its original course, and thence, through the eye-piece C, to the eye of the observer. The image formed by the ray from this source being brought to the point of bisection by the cross hair M, the telescopic tube B is moved out or in, by means of the rack and pinion, Q R, Fig. 1, carrying with it the tube K with its contained prism $P^1$, until this prism $P^1$ receives the oblique ray from the object and the image formed through this source is also brought to the point of bisection by the cross-hair M, this oblique ray taking the course of the dotted lines through prisms $P^1$, $P^2$ and $P^3$, Fig. 3, and thence, parallel to the direct ray, through the object-glass O and eye-piece C to the eye of the observer, Fig. 5. When the two images formed by the direct and oblique rays, respectively, are brought to the point of bisection indicated by the cross-hair M, they will also be in coincidence. The variable-base scale N, moving in unison with the tube B which through its junction with the tube K also carries the prism P¹, is a measure of the distance that it has been found necessary to move the prism P¹ from the optical center of the object-glass O and eye-piece C to bring the oblique ray image to the point of bisection by the cross-hair M, and the reading for distance is taken from the scale at the point at which it is crossed by the cross-hair M.

I claim:—

1. A range-finder comprising two systems of reflecting prisms arranged to reflect the rays from a distant object to produce two images in proximity to each other, a fixed eye piece for viewing both of said images, a fixed indicator arranged to be viewed through said eye-piece, a scale graduated in correspondence with the position of one of said prisms, and means for moving said scale relatively to the indicator, and, with said scale, said latter prism to correspondingly vary the position of the image received therethrough, substantially as described.

2. A range-finder comprising an eye-piece and two systems of reflecting prisms arranged to reflect the rays from a distant object to produce two images in proximity to each other, means for moving one of said prisms, and a scale movable with said latter prism, the correct reading of the scale being, by the movement of said prism and scale brought into position to be read through the eye-piece, substantially as described.

3. A range-finder comprising two systems of reflecting prisms located in two planes at right angles to each other, and arranged to form, from a common object, images in proximity to each other, and means for varying the distance between two prisms of one of the systems correspondingly to the distance of the object, substantially as described.

4. A range-finder comprising two systems of reflecting prisms located in two planes at right angles to each other, and arranged to form, from a common object, images in proximity to each other, and two tubes, one slidable upon the other, one of the tubes carrying a prism of one of said systems and the other tube carrying another prism of the same system, substantially as described.

5. A range-finder comprising an eye-piece, two systems of reflecting prisms located in two separate planes, the prisms of one system being arranged to reflect the rays proceeding from a distant object to the eye-piece in a direction parallel with, but removed from, the path of the rays direct from the object, and the prisms of the other system being arranged to reflect the rays proceeding from the object into a path to the eye-piece slightly oblique to the direction of their path immediately leading from the object, and means for varying the relative position of the rays of the latter system, substantially as described.

6. A range-finder comprising two systems of reflecting prisms located in two planes at right angles to each other, and means for adjusting said prisms to receive therethrough two images from the same object and conveying them to the eye of an observer, as set forth.

7. A range-finder comprising two systems of reflecting prisms lying in two different planes at right angles, the one to the other, the said prisms being so arranged as to throw two rays from the same object in a final course in the same plane and parallel to each other, and means for bringing the two images thus formed to a common line of bisection and coincidence, as set forth.

8. A range-finder comprising an end-closed tube having a longitudinal guide-slot and an end slot, and two attached tubes which are at right angles to each other and also to the axis of the said end-closed tube, two systems of reflecting prisms arranged in these said tubes and lying in two planes at right angles to each other and adapted to reflect two rays from the same object in a final course in the same plane and parallel to each other, and an object-glass and eye-piece optically disposed for viewing the two images formed by the said rays, as set forth.

9. A range-finder comprising a longitudinally slotted tube with closed ends, one of which ends has a guide-slot opening, the said longitudinally slotted tube having an attached eye-piece and a finder tube, a contained movable cylinder, two systems of reflecting prisms arranged within the said slotted tube and its attached tubes, and lying in two planes at right angles to each other and adapted to reflect two rays from the same object until parallel and in the same plane, a cross-hair and an object-glass and eye-piece optically arranged for viewing the cross-hair and two images formed by the said two rays, as set forth.

10. A range-finder comprising a fixed inner tube, an outer tube moving telescopically over the inner tube, a tubular casing over the outer tube, a short tube within the inner tube and connected to the outer tube, a prism for the oblique ray in said short tube, and a fixed eye piece tube, the movable tube being slotted to permit it to move past said eye piece tube, substantially as described.

11. The combination of a fixed tubular casing, a fixed finder tube and eye piece tube, a fixed inner tube, a tube sliding between said inner tube and tubular casing, a reflecting prism supported by said inner tube, and an oblique ray prism carried by said slidable tube, substantially as described.

12. The combination of an eye piece tube, a casing and an inner tube each secured near one end thereof to the eye piece tube, and extending in opposite directions from said eye piece tube, a telescoping tube movable between said inner tube and casing and having a slot permitting it to move past said eye piece tube, a reflecting prism supported by said inner tube, and an oblique ray reflecting prism supported by said telescoping tube, said inner tube being slotted to permit the rays to enter said telescoping tube in all positions, substantially as described.

13. The combination of a fixed tubular casing, a fixed eye piece tube, a slidable tube, an oblique ray prism carried by said slidable tube, a fixed reflecting prism, and direct ray prisms arranged to bring the direct image into proximity with the oblique image carried by said inner tube, substantially as described.

In testimony whereof I have hereunto set my hand in the presence of two subscribing witnesses.

GRAVES GRIFFITH.

Witnesses:
  FRANCIS M. WRIGHT,
  D. B. RICHARDS.